United States Patent
Bonilla et al.

(12) 
(10) Patent No.: US 6,307,152 B1
(45) Date of Patent: *Oct. 23, 2001

(54) POKE-THROUGH FLOOR FITTING

(75) Inventors: Nelson Bonilla, West Haven; Rajiv D. Katwala, Milford, both of CT (US)

(73) Assignee: Hubbell Incorporated, Orange, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/432,421

(22) Filed: Nov. 2, 1999

Related U.S. Application Data

(63) Continuation-in-part of application No. 09/173,551, filed on Oct. 16, 1998, now Pat. No. 6,114,623.

(51) Int. Cl.$^7$ ....................................................... H02G 3/04
(52) U.S. Cl. ................................ 174/48; 174/50; 174/53; 439/650; 52/220.8; 220/3.8
(58) Field of Search ................................... 174/48, 50, 53, 174/58; 200/43.18; 439/535, 536, 538, 650, 107; 52/220.1, 220.8, 220.3; 220/3.3, 3.7; D13/137, 143, 146

(56) References Cited

U.S. PATENT DOCUMENTS

| | | |
|---|---|---|
| D. 389,459 | 1/1998 | Byrne . |
| D. 399,826 | 10/1998 | Byrne . |
| D. 408,355 | 4/1999 | Welsh et al. . |
| D. 409,980 | 5/1999 | Byrne . |
| 1,318,733 | 10/1919 | Eckstein . |
| 1,717,836 | 6/1929 | Conner . |
| 2,916,540 | 12/1959 | Rostan . |
| 4,243,835 | 1/1981 | Ehrenfels . |
| 4,266,266 | 5/1981 | Sanner . |
| 4,323,724 | 4/1982 | Shine . |
| 4,336,416 | 6/1982 | Goodsell . |
| 4,379,605 * | 4/1983 | Hoffman ............................... 439/107 |
| 4,433,204 | 2/1984 | Wuertz . |
| 4,477,694 | 10/1984 | Kohaut . |
| 4,496,790 | 1/1985 | Spencer . |
| 4,770,643 | 9/1988 | Castellani et al. . |

(List continued on next page.)

FOREIGN PATENT DOCUMENTS 1116385   5/1954   (FR) .

OTHER PUBLICATIONS

Wiremold Walker RCI Poke–Thrus, RC2001; Walker advertisement; Aug. 1997.

Hubbell Wiring Device—Kellems, Hubbell advertisement, Category 5/Power Flush Fire Rated Poke Through Fitting, Apr. 1998.

RACO Electrical Products R–192 Catalog, published prior to Oct. 1998, p. C3.

Hubbell Premise Wiring, Inc., Catalog #1100R, published prior to Oct. 1998, pp. 122 and 133.

Hubbell Wiring Devices & Systems—Kellems Wire Management—Marine Wiring Products Catalog #2000, 1995, pp. K–17 and K–80 through K–88.

*Primary Examiner*—Dean A. Reichard
*Assistant Examiner*—Dhiru R. Patel
(74) *Attorney, Agent, or Firm*—Alfred N. Goodman; Mark S. Bicks; Jeffrey J. Howell

(57) ABSTRACT

A fire-rated, poke-through floor fitting preferably for use in a three inch diameter bore within a floor. The fitting has an electrical receptacle that is sized to fit within the three inch bore. The receptacle preferably has two pairs of electrical outlets coupled to the electrical receptacle along with four voice/data jacks. The fitting provides a high number of electrical outlets and voice/data jacks, while maintaining a relatively low profile and easy accessibility. Each pair of electrical outlets can be separately connected to different power sources or each pair can be connected to the same power source.

44 Claims, 6 Drawing Sheets

U.S. PATENT DOCUMENTS

| | | |
|---|---|---|
| 4,827,080 | 5/1989 | Castellani et al. . |
| 4,922,668 | 5/1990 | Payne . |
| 4,978,318 | 12/1990 | Wiley et al. . |
| 4,993,970 | 2/1991 | Littrell . |
| 5,003,127 | 3/1991 | Sosinski et al. . |
| 5,008,491 | 4/1991 | Bowman . |
| 5,032,690 | 7/1991 | Bloom . |
| 5,064,969 | 11/1991 | Bloom . |
| 5,102,355 | 4/1992 | Murphy et al. . |
| 5,107,072 | 4/1992 | Morgan . |
| 5,109,316 | 4/1992 | Murphy . |
| 5,121,594 | 6/1992 | Wuertz . |
| 5,124,876 | 6/1992 | Misencik et al. . |
| 5,134,541 | 7/1992 | Froulin . |
| 5,135,411 | 8/1992 | Wiley et al. . |
| 5,203,712 * | 4/1993 | Kilpatrick et al. .................. 439/215 |
| 5,220,131 | 6/1993 | Wuertz . |
| 5,237,128 | 8/1993 | Wuertz . |
| 5,272,278 | 12/1993 | Wuertz . |
| 5,281,172 | 1/1994 | Luu . |
| 5,393,930 | 2/1995 | Wuertz . |
| 5,410,103 | 4/1995 | Wuertz . |
| 5,422,434 | 6/1995 | Wuertz et al. . |
| 5,460,542 | 10/1995 | Castellani et al. . |
| 5,466,886 | 11/1995 | Lengyel et al. . |
| 5,486,121 | 1/1996 | Miller . |
| 5,541,363 | 7/1996 | Weise et al. . |
| 5,601,455 | 2/1997 | Bagga . |
| 5,606,606 | 2/1997 | Schneider et al. . |
| 5,763,826 | 6/1998 | Castellani et al. . |
| 5,839,908 * | 11/1998 | Bonilla et al. ........................ 439/107 |
| 6,018,126 | 1/2000 | Castellani et al. ..................... 174/48 |
| 6,109,937 * | 8/2000 | Bonilla et al. ........................ 439/107 |
| 6,113,434 * | 9/2000 | Pate ...................................... 439/652 |

\* cited by examiner

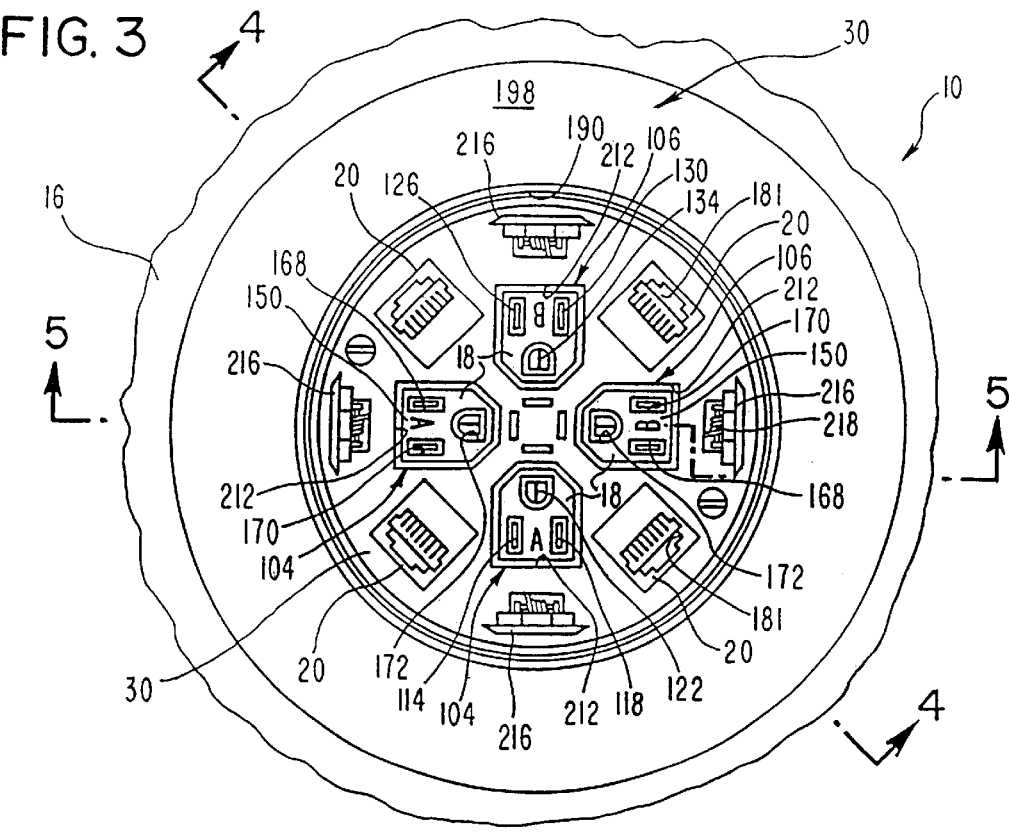
FIG. 3
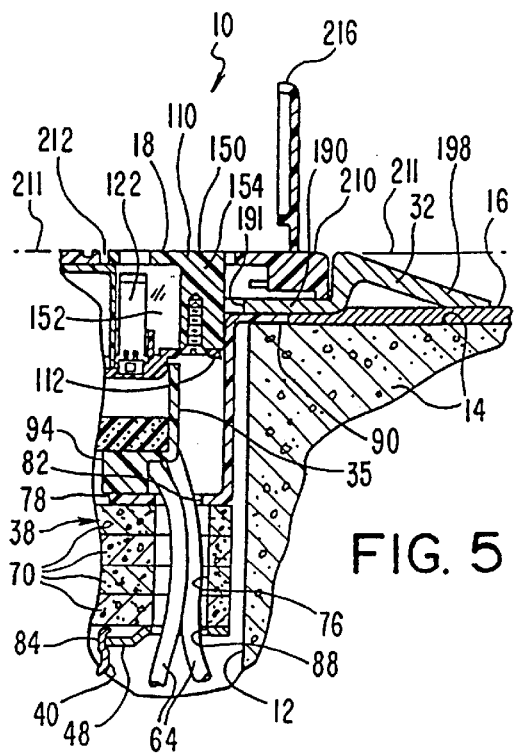
FIG. 4
FIG. 5

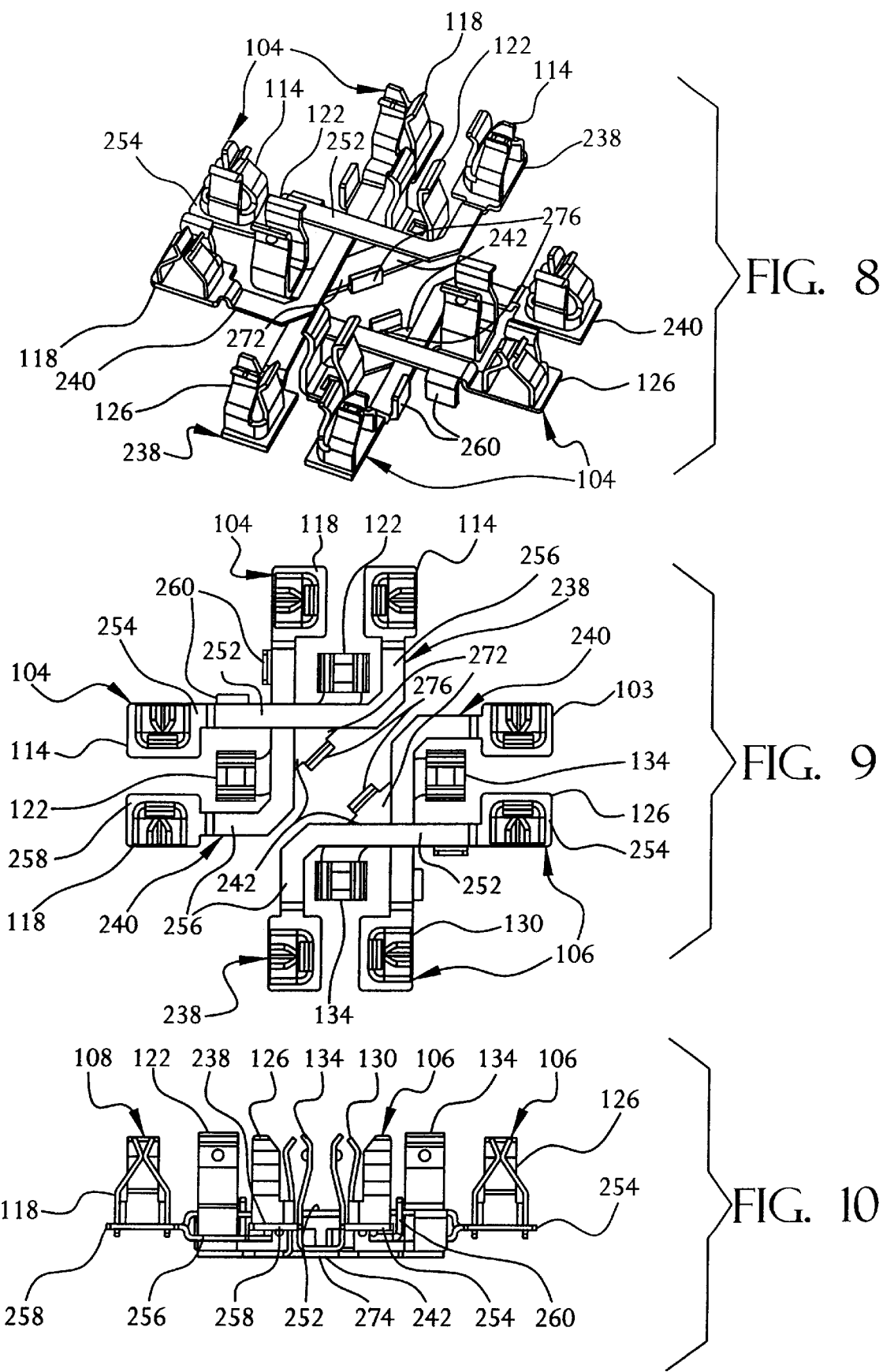

POKE-THROUGH FLOOR FITTING

This application is a continuation-in-part of application Ser. No. 09/173,551, filed Oct. 16, 1998, now U.S. Pat. No. 6,114,623.

FIELD OF THE INVENTION

The present invention relates to a poke-through floor fitting to enable access to both electrical outlets and telecommunication connections. More specifically, the present invention relates to a fire-rated poke-through floor fitting for use in a three-inch diameter bore and having four electrical outlets and four voice/data jacks while maintaining a low profile.

BACKGROUND OF THE INVENTION

Typically, fire-rated poke-through fittings provide a floor receptacle for electrical outlets and/or for telecommunication access. Generally, these poke-through fittings are mounted in a core-drilled, three inch diameter hole, which is commonly formed in a concrete floor.

Due to the three inch diameter of the bore used for the typical poke-through fittings, the size of the typical fitting is inherently constrained, especially if it is desired to keep the fitting as close to the floor as possible, i.e., if it is desired to keep the fitting relatively flat with a low profile. Recently, the consistently increasing need for additional electrical outlets and telecommunication access at each workstation has made the prior art fittings deficient due to the limited number of electrical outlets and the limited amount of telecommunication access. This is especially true when a low profile, but easily accessible fitting is desired.

Examples of prior art fittings are disclosed in the following U.S. patents: U.S. Pat. No. 4,770,643 to Castellani et al.; U.S. Pat. No. 4,323,724 to Shine; U.S. Pat. No. 5,008,491 to Bowman; U.S. Pat. No. 5,442,434 to Wuertz et al.; U.S. Pat. No. 5,393,930 to Wuertz; U.S. Pat. No. 5,272,278 to Wuertz; U.S. Pat. No. 5,237,128 to Wuertz; U.S. Pat. No. 5,220,131 to Wuertz; U.S. Pat. No. 5,121,594 to Wuertz; U.S. Pat. No. 4,433,204 to Wuertz; U.S. Pat. No. 4,336,416 to Goodsell; U.S. Pat. No. 4,243,835 to Ehrenfels; U.S. Pat. No. 5,410,103 to Wuertz; U.S. Pat. No. 4,496,790 to Spencer; U.S. Pat. No. 4,922,668 to Payne; and U.S. Pat. No. 4,266,266 to Sanner, the disclosures of which are incorporated herein by reference.

SUMMARY OF THE INVENTION

Accordingly, an object of this invention is to provide an improved poke-through floor fitting.

Another object of this invention is to provide an improved poke-through floor fitting with increased electrical connections and increased telecommunication access.

Still another object of the invention is to provide a poke-through floor fitting with a low profile that is easily accessible.

Yet another object of this invention is to provide a poke-through floor fitting having two pairs of electrical outlets that are each electrically connected to a different electrical source.

The foregoing objects are basically obtained by providing a fitting comprising an electrical receptacle being sized to fit within an approximately three inch diameter substantially circular opening; a first pair of electrical outlets coupled to the electrical receptacle; a second pair of electrical outlets coupled to the electrical receptacle; and first, second, third, and fourth voice/data outlets coupled to the electrical receptacle.

The foregoing objects are further obtained by providing a fitting comprising: an electrical receptacle; a first pair of electrical outlets coupled to the electrical receptacle and electrically connected to a first electrical source by a first set of electrical wires; a second pair of electrical outlets coupled to the electrical receptacle and electrically connected to a second electrical source by a second set of electrical wires; and at least one voice/data outlet coupled to the electrical receptacle.

The foregoing objects are still further obtained by providing a fitting comprising: an electrical receptacle; at least one electrical outlet coupled to the electrical receptacle; at least one voice/data jack coupled to the electrical receptacle; a cover coupled to the electrical receptacle, the cover having a top planar surface and at least one access opening for accessing the at least one electrical outlet and the at least one voice/data jack through the cover; and the at least one electrical outlet having an uppermost surface and the at least one voice/data jack having an uppermost surface, and the uppermost surface of the at least one electrical outlet and the at least one voice/data jack being substantially flush with or below the top planar surface of the cover.

Other objects, advantages, and salient features of the invention will become apparent from the following detailed description which, taken in conjunction with the annexed drawings, discloses a preferred embodiment of the invention.

BRIEF DESCRIPTION OF THE DRAWINGS

Referring to the drawings which form a part of this original disclosure:

FIG. 3 is a top view of the poke-through floor fitting in accordance with the first embodiment of the invention as illustrated in FIG. 1, with the fitting inserted into a floor and with the hinged covers of the electrical outlets in the open position;

FIG. 4 is a partial cross-sectional view of the floor fitting in accordance with the first embodiment, taken along line 4—4 of FIG. 3;

FIG. 5 is a partial cross-sectional view of the floor fitting in accordance with the first embodiment taken along line 5—5 in FIG. 3;

FIG. 8 is a top, front, side perspective view of the bus bars and terminals in accordance with the invention removed from the base but arranged as positioned with the base;

FIG. 9 is a top view of the bus bars and terminals in accordance with the invention removed from the base but arranged as positioned with the base; and FIG. 10 is side view of the bus bars and terminals in accordance with the invention removed from the base but arranged as positioned with the base.

DETAILED DESCRIPTION OF PREFERRED EMBODIMENTS

Figure 1:
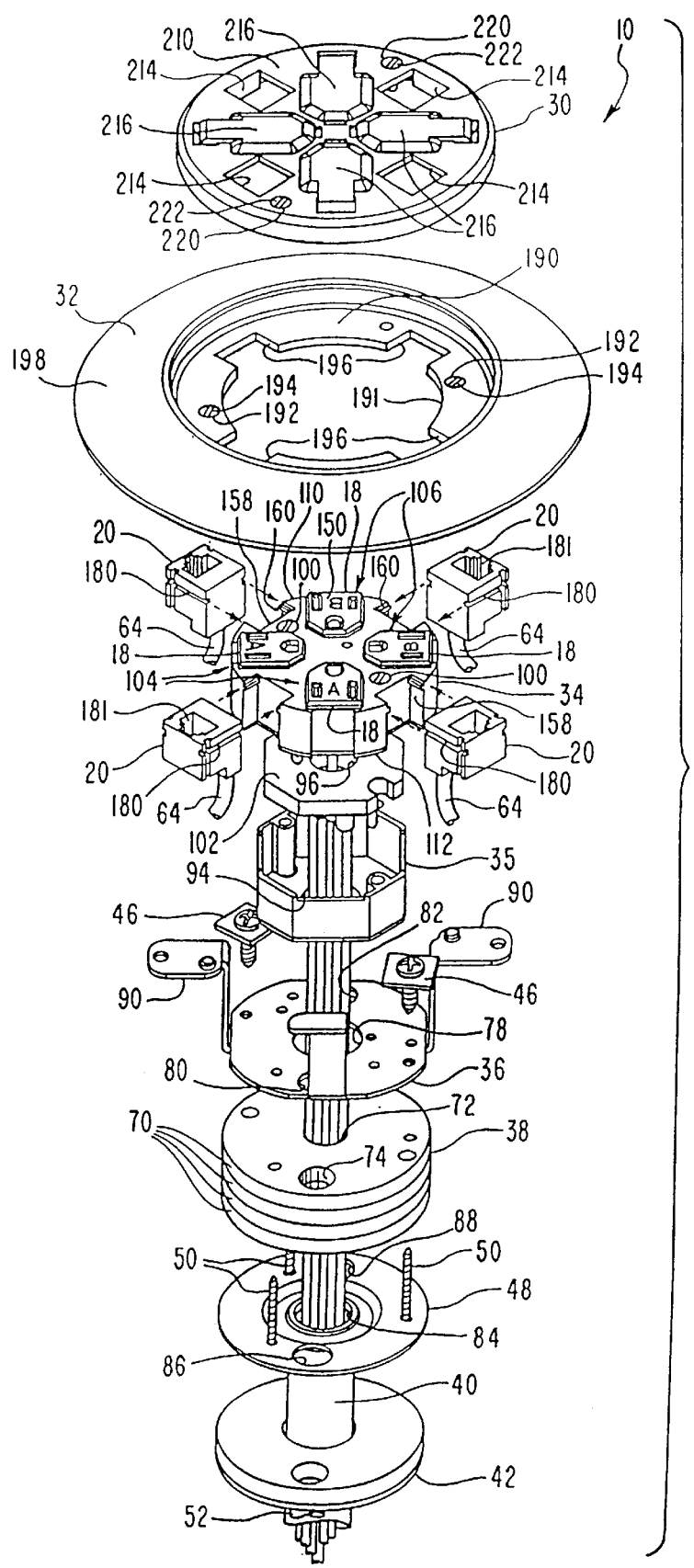
FIG. 1 is a top-side exploded, perspective view of a poke-through floor fitting in accordance with a first embodiment of the present invention, illustrating the fitting detached from the floor.
Figure 2:
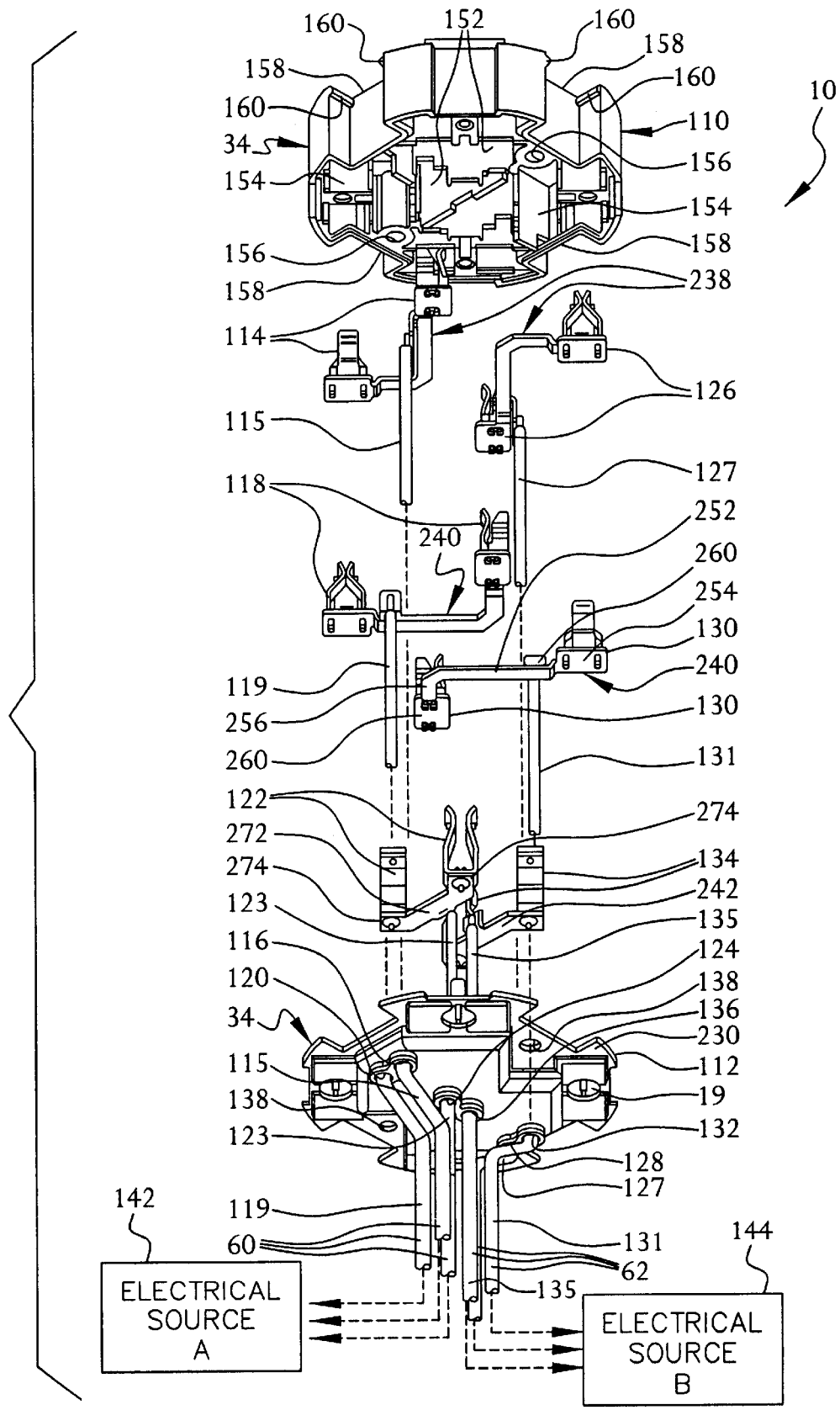
FIG. 2 is a partial, bottom-side exploded, perspective view of the poke-through floor fitting in accordance with the first embodiment of the present invention and as illustrated in FIG. 1, but illustrating only the receptacle, the electrical contacts, the lead wires and the electrical sources.

FIGS. 1–5 illustrate a fitting 10 in accordance with a first embodiment of the present invention. Fitting 10 is a fire-rated, poke-through floor fitting. When assembled, fitting 10 is preferably intended to be inserted into a bore 12 formed in a concrete floor 14. The fitting 10 then provides easy access to electrical outlets 18 and voice/data jacks 20 at a position on floor 14 that is typically spaced from any walls. Fitting 10 provides easy access to a plurality of electrical outlets 18 and voice/data outlets or jacks 20. Preferably, fitting 10 provides access to four electrical outlets 18 and four voice/data jacks 20. The fitting 10 provides access through floor 14 and on top of any flooring 16, such as carpeting, which is placed on top of floor 14.

Although fitting 10 is illustrated with a concrete floor 14, fitting 10 can be used in any surface containing an opening capable of receiving fitting 10.

Fitting 10 is formed of a cover 30, a flange 32, a receptacle or housing 34, an insulator 35, a floor cup 36, a fire barrier 38, a wiring tube 40 with an upper flange rigidly secured thereto, and a collar 42.

The basic structure of the floor cup 36, fire barrier 38, wiring tube 40 and collar 42 in connection with fire-rated poke-through fittings are generally known in the art, and therefore will not be described in great detail herein.

Floor cup 36 in conjunction with positioning clips 46, which are also known in the art, locate and secure fitting 10 within bore 12 at the top of floor 14. Floor cup 36, fire barrier 38, and an upper disk 48 of wiring tube 40 are all secured together by screws 50 as is known in the art. Upper disk 48 is rigidly connected to wiring tube 40. Collar 42 is spaced from fire barrier 38 as necessarily dependent on the characteristics of the floor, and is also rigidly attached to wiring tube 40 as known in the art. Two wiring cylinders are also rigidly attached to collar 42. Only one wiring cylinder 52 is shown.

Wiring tube 40 provides a passageway for first and second sets of electrical wires 60 and 62, respectively, as they proceed between an electrical power sources to receptacle 34. The sets of electrical wires 60 and 62 are conventional electrical wire, which is appropriate for conventional electrical outlets.

The wiring cylinders including cylinder 52 provide a passageway for voice/data cabling 64. Preferably, one voice/data cable 64 is connected to each of the jacks 20 as known in the art. Additionally, voice/data cabling 64 is connected to appropriate apparatus; such as to telephone or voice/data transmissions systems, as known in the art Fire barrier 38 is an intumescent fire barrier, as generally known in the art. Preferably, fire barrier 38 is formed of a plurality of ring-shaped members 70 having a central opening 72 for receiving first and second sets of electrical wire 60 and 62 as well as side openings 74 and 76 for receiving voice/data cable 64. Preferably, each side opening 74 and 74 receives two voice/data cables 64.

Likewise, floor cup 36 and upper disk 48 have passages for electrical wires 60 and 62 and voice/data cables 64. That is, floor cup 36 has a central opening 78 and upper disk 48 has a central opening 84 for electrical wires 60 and 62. Also, floor cup 36 and upper disk 48 have side openings 80, 82 and 86, 88, respectively, for voice/data cables 64, preferably for two voice/data cables 64 in each side opening 80, 82, 86 and 88.

Insulator 35 is generally known in the art and is a preferably a plastic box-like member, which is rigidly coupled to the top of upper disk 48 by a screw (not shown). Insulator 35 has a bottom opening 94 for the passage of electrical wires 60 and 62 therethrough. Also, a fire barrier insulator 102 is positioned within insulator 35, at its bottom. Fire barrier insulator 102 is formed from a foam-like material, as generally known in the art and has an aperture 96 for the passage of electrical wires 60 and 62 therethrough.

Receptacle 34 is positioned on top of insulator 35 and is rigidly secured to floor cup 36 by screws 100, which extend through receptacle 34 and attach to a threaded opening the bottom of floor cup 36. Receptacle 34 has a top 10 and a base 112 that forms a hollow cavity and both top 110 and base 112 are preferably integrally formed from plastic material, each as one-piece, unitary members. Receptacle 34 houses two pairs of electrical outlets 18. The first pair of electrical outlets 104 comprise the "A" pair of outlets and the second pair of electrical outlets 106 comprise the "B" pair of outlets. Each pair of outlets 104 and 106 are electrically wired together as is known in the art. Receptacle 34 is efficiently formed to fit within a three inch diameter opening. That is, receptacle 34 has a width in any direction of plane 211 of less than three inches.

Base 112 acts as the support for the electrical contacts of all the electrical outlets 18. That is, on the upper surface of base 12 the contacts for the electrical outlets are rigidly attached to base 112. Additionally, base 112 has holes extending completely through base 112 for each lead wire of the first and second sets of electrical wires 60 and 62 to pass between bottom opening 94 of insulator 35 and the electrical contacts. Base 112 is rigidly attached to floor cup 36 by screws 100 extending through openings 138. Base has a top surface 228 and a bottom surface 230.

Contact terminals for each of the first and second pairs of electrical outlets 104 and 106 are positioned on top of base 112. Specifically, with respect to the "A" side of receptacle 34, a side "A" hot contact terminal 114 is attached to base 112 and is attached to a side "A" hot lead wire 115, which extends through hole 116 in base 112. A side "A" neutral terminal 118 is attached to base 112 and is attached to a side "A" neutral lead wire 119, which extends through hole 120 in base 112. Also, a side "A" ground terminal 122 is attached to base 112 and to a side "A" ground lead wire 123, which extends through hole 124 in base 112.

With respect to the "B" side, a side "B" hot contact terminal 126 is attached to base 112 and to a side "B" hot lead wire 127, which extends through hole 128 in base 112. A side "B" neutral terminal 130 is attached to base 112 and to a side "B" neutral lead wire 131, which extends through hole 132 in base 112. Finally, a side "B" ground terminal 134 is attached to base 112 and to a side "B" ground lead wire 135, which extends through hole 136 in base 112. The terminals 114, 118, 122, 126, 130 and 134 are generally known in the art, except for their specific structural configurations. Also, the electrical connection between the terminals and the lead wires is a conventional connection that is appropriate and is known in the art; such as soldering.

Lead wires 115, 119 and 123 form first set of electrical wires 60 and lead wires 127, 131, and 135 form second set of electrical wires 62. These lead wires are extend from each terminal and through their respective hole in base 112 in order to extend through wiring tube 40 to their respective electrical power source 142 and 144, as known in the art.

Preferably, the first or "A" pair of electrical outlets 104 is electrically distinct from the second or "B" pair of electrical outlets 106. That is, preferably, the side "A" hot contact terminal 114, side "A" neutral terminal 118, and side "A"

ground terminal 122, extend to a first or "A" power source 142 and is electrically connected with appropriate circuitry as is known in the art. Likewise, preferably the side "B" hot contact terminal 126, side "B" neutral terminal 130, and side "B" ground terminal 134 are electrically connected to a second or "B" power source 144 through appropriate circuitry as is known in the art. Thus, the electrical separation between the "A" pair of outlets 104 and "B" pair of outlets 106. i.e., that each is preferably connected an a different power source 142 or 144, provides a more versatile fitting 10 in that each pair of outlets 104 and 106 can be electrically connected to different power sources 142 or 144. Therefore, the electrical devices plugged into the "A" outlets 20 can be can be electrically connected to a different power source than those electrical devices plugged into the "B" outlets 20. This allows electrical devices having larger electrical requirements to be used with fitting 10.

Top 110 of receptacle 34 is positioned on top of base 112 and completely encloses contact terminals 114, 118, 122, 126, 130 and 134. Top 110 is preferably made of a plastic material similar to base 112. Top 110 also has holes 156 for receiving screws 100, which secure top 110 and base 112 to floor cup 36.

Top 110 has a plurality of receptacle faces 150 that extend upwardly away from top 110. Two of the receptacle faces 150 form part of the "A" pair of electrical outlets 104 while the other two receptacle faces 150 form part of the "B" pair of electrical outlets 106.

Top 110 is formed of a plurality of hollow compartments 152 separated by walls 154. The compartments include one compartment for each of the individual contact terminals 114, 118, 122, 126, 130, and 134. Thus, those terminals are appropriately spaced and insulated from each other. Electrical outlets 18 can result in various forms such as NEMA 5-15R power outlets.

Top 110 also has four indents 158 formed on the outer surface of its side wall. Each indent 158 is sized to receive one voice/data jack 20. Voice/data jacks 20 themselves are conventional voice/data jacks as known in the art. For example, voice/data jacks 20 can be Category 5 telecommunication jacks. Further, jacks 20 can be eight position/eight wire jacks or other multi-position/multi-wire jacks.

Each voice/data jack 20 has a pair of slots 180 that are parallel and spaced. One slot 180 is formed on each side of jack 20. Also, each voice/data jack 20 has an upper opening 181 and a lower opening 182, both of which are known in the art. Upper opening 181 is the female end of a connection and is adapted to receive the appropriate male voice/data connector (not shown), which is also known in the art. For example, upper opening 181 can be sized to receive a conventional telecommunications connector located at the end of a conventional telecommunications-type cord (not shown). Lower opening receives the appropriate voice/data cable 64 for attaching to voice/data jack 20, as known in the art.

In order to receive a voice/data jack 20, each indent 158 has a pair of spaced horizontal, parallel ribs 160, which are integrally formed with the side of receptacle 34. Each indent 158 together with ribs 160 receives a single voice/data jack 20 in a slid able manner. That is, before cover 30 is placed on receptacle 34, each voice/data jack 20 is positioned such that each rib 160 of an indent 158 slides smoothly within a mating slot 180 in a voice/data jack 20. Thus, indents 158 enable each jack 20 to be slid within each indent 158 and securely positioned adjacent to the outside of receptacle 34, spaced from all of the elements within receptacle 34; such as, terminals 114, 118, etc. Also, the alternating positioning of indents 158 between electrical outlets 18 results in alternating positioning of outlets 18 and jacks 20 around the perimeter of cover 30. This further aids in producing a compact fitting, which efficiently uses limited space.

Voice/data cable 64 extends from each jack 20, through one of the side openings 80 or 82 in floor cup 36, through one of the side openings 74 or 76 in fire barrier 38 through one of the side openings 86 or 88 in upper disk 48, through one of the wiring cylinders such as cylinder 52, and proceeds to its appropriate voice/data apparatus, such apparatus being generally known in the art.

Prior to inserting jacks 20 in indents 196, the openings created by indents 196 can be occupied by inserts (not shown) that take the place of jacks 20. These inserts can be used if less than four jacks 20 are being used, or during the shipping of fitting 10, if jacks 20 are installed at a later time. Preferably, the inserts are shaped similar to jacks 20 and have parallel slots, substantially identical to slots 180 on jacks 20. Although four jacks 20 are illustrated, any number of jacks 20 can be used.

Each receptacle face 150 of top 110 has three openings for receiving an electrical plug (not shown) as known in the art. Each receptacle face 150 has a hot contact terminal opening 168, a neutral contact terminal opening 170 and a ground contact terminal opening 172.

Flange 32 is positioned on top of receptacle 34 and secured thereto by screws 194. Flange 32 has a depressed inner portion 190 with an access opening 191 and holes 192 for receiving screws 194. Screws 194 rigidly secure flange 32 to upper extensions 90 of floor cup 36. Inner portion 190 is depressed for receiving cover 30 as discussed below. Flange 32 has an outer portion 198 extending from inner portion 190 in an inclined manner to provide a gradual increasing of fitting 10 in from flooring 16 to the height of the first and second pair of outlets 104 and 106 and jacks 20.

Preferably, flange 32 is made of metal. Also, the uppermost portion of flange 32 is substantially flush with plane 211. Further, flange 32 preferably has a total vertical height of approximately 0.46–0.53 inches. Thus, the height of the plane 211, or the uppermost portion of flange 32 can be approximately 0.46–0.53 inches. This relatively low height results in a low profile for fitting 10 which is aesthetically pleasing and is less of an obstruction to those walking on floor 14 or to the furniture on floor 14.

Cover 30 is formed of plastic material and is sized to be inserted into the depression formed by inner portion 190 of flange 32. Preferably cover 30 is generally circular in shape with an outer diameter of approximately 4.360 inches in order to fit within flange 32 and in order to be as compact as possible. Cover 30 has a top planar surface 210 that lies in a plane 211, which is substantially parallel to the top surface of flooring 16 and floor 14. Top planar surface 210 has four outlet openings 212, each appropriately sized to allow a electrical plug (not shown) access to an electrical outlet 18. Also, top planar surface 210 has four jack openings 214 to allow conventional voice/data connectors (not shown) to access jacks 20.

Each outlet opening 212 has a hinged lid 216 attached adjacent thereto. Each hinged lid 216 is biased by a spring 218 towards the closed position, in which the lid 216 covers a single outlet opening 212 completely and lies substantially parallel to top planar surface 210. Cover 30 also has holes 220 for receiving screws 222 for rigidly securing cover 30 on flange 32.

As seen in FIGS. 4 and 5, the top planar surface 210 is substantially flush with plane 211. Also, the top of each jack 20 and the top of each receptacle face 150 is substantially flush with plane 211 and surface 210. Although, receptacle faces 150 and the tops of jacks 20 can be slightly below plane 211, preferably, these elements do not extend above plane 214 so that a smooth profile may be maintained between the elements. This configuration of the smooth, low profile of fitting 10 allows for a more aesthetically pleasing appearance and is less of an obstruction for those walking on or around an unused fitting 10, with lids 216 in the closed position.

Figure 6:
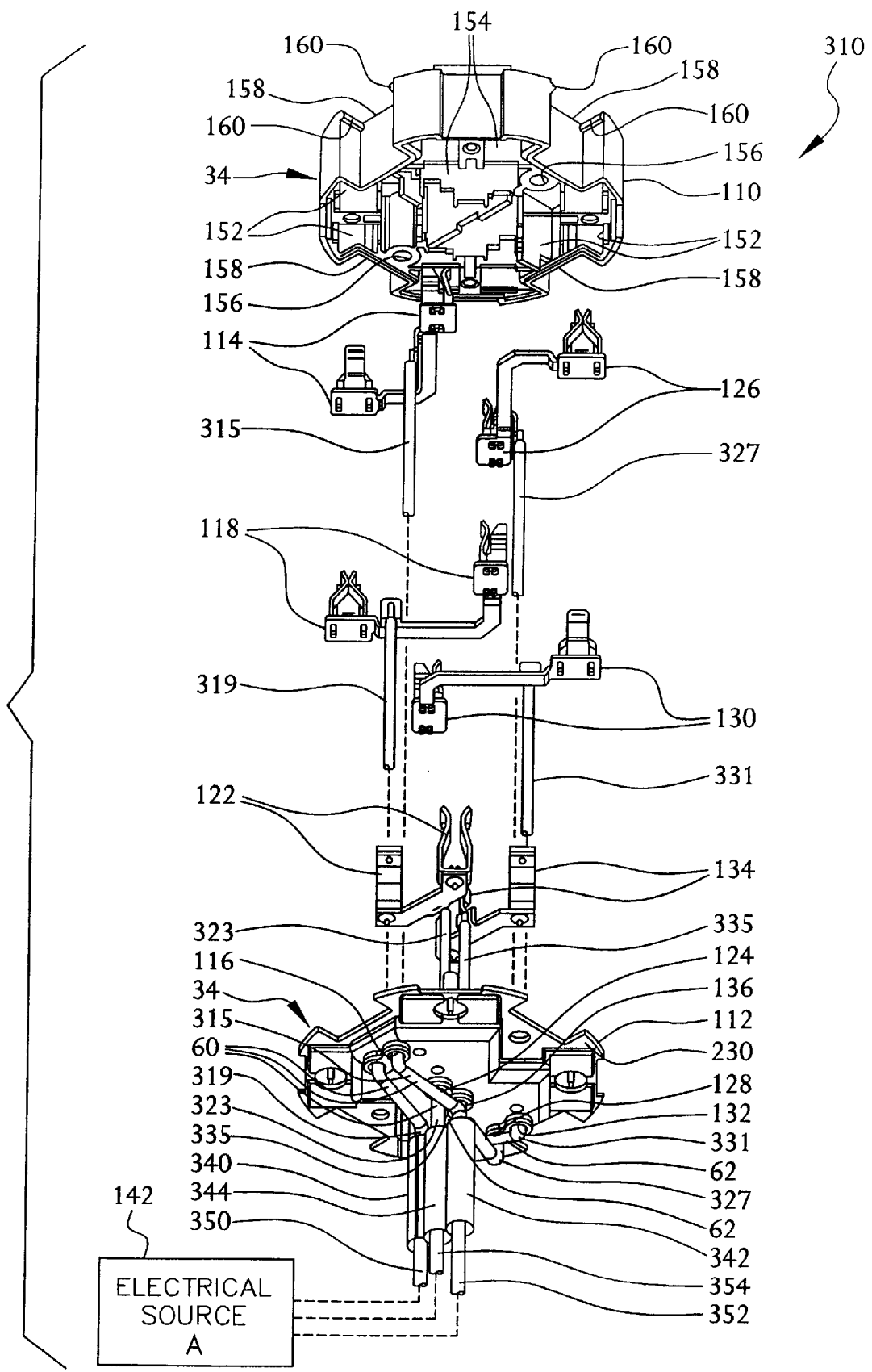
FIG. 6 is a partial, bottom-side exploded, perspective view of the poke-through floor fitting similar to FIG. 2, but in accordance with a second embodiment of the present invention.
Figure 7:
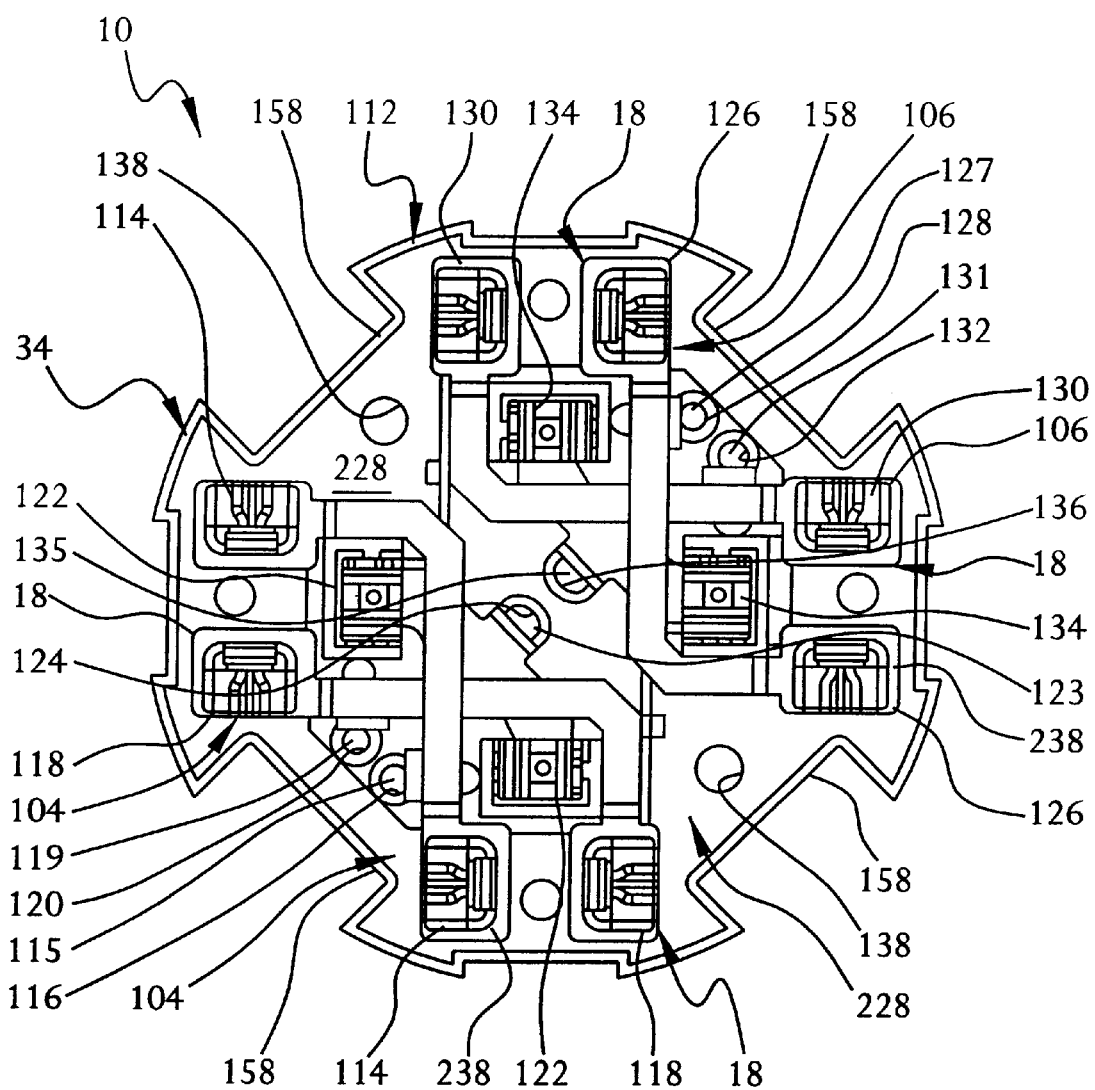
FIG. 7 is a top view of the base of the receptacle in accordance with the present invention, with bus bars and terminals exposed and positioned within the base.

FIG. 6 illustrates a fitting 310 in accordance with a second embodiment of the present invention. Fitting 310 is substantially identical in all respects to fitting 10 except for the manner in which the lead wires extend from their appropriate contact terminals and exit fitting 310. Specifically, fitting 310 includes a side "A" hot lead wire 315, a side "A" neutral lead wire 319, and side "A" ground lead wire 323, a side "B" hot lead wire 327, a side "B" neutral lead wire 331, and a side "B" ground lead wire 335 that all extend through their respective holes in base 112 as discussed above with respect to fitting 10 and their corresponding lead wires.

However, once the lead wires exit base 112 they are joined in fitting 310 in a manner different than in fitting 10. That is, the side "A" and side "B" hot lead wires 315 and 327 are connected below base 112 with a combined hot lead wire 350. Likewise, neutral lead wires 319 and 331 of sides "A" and "B" are connected below base 112 to the combined neutral lead wire 352 and ground lead wires 323 and 335 from sides "A" and "B" are connected below base 112 and combined with ground lead 354.

The connections between the "A" and "B" lead wires 315, 327, 319, 331, 323 and 335 and their respective combined lead wires 350, 352 and 354 are conventional connections, such as welding.

The connection of the hot lead wires 315, 327, and 350 is covered by a heat shrink tubing 340, as is generally known in the art. Likewise, the connection of the neutral lead wires 319, 331 and 352 is preferably covered by heat shrink tubing 342, and the connection of the ground lead wires 323, 335 and 354 is covered by heat shrink tubing 344.

Combined leads 350, 352 and 354 then proceed as known in the art to a single power source 142 with appropriate circuitry as known in the art. Thus, fitting 310 provides for both pairs of electrical outlets 104 and 106 being electrically connected to a single power source to simplify the circuitry.

Also, it should be understood that various combinations of lead connections can occur to further provide versatility in the manner in which electrical outlets are electrically wired. For example, only the ground lead wires 323 and 335 can be connected to a combined lead wire 354, while the hot and neutral lead wires remain substantially identical to those of fitting 10. Thus, five lead wires would then exit fitting 310. Another example would be to connect ground lead wires 323 and 335 to combined ground lead wire 354 and to connect neutral lead wires 319 and 331 to combined neutral lead wire 352. This would result in four lead wires exiting fitting 310.

Therefore, between fitting 10 and the various embodiments of fitting 310, three, four, five, or six wires can exit a fitting in accordance with the present invention.

Thus, fittings 10 and 310 provide fittings that can be used in a three inch bore and that optimize the arrangement of elements to produce a compact fitting with a relatively high number of electrical and voice/data connections while maintaining a low profile, which is generally flat and close to the floor. Additionally, although four electrical outlets 18 and four voice data jacks 20 are illustrated, fittings 10 and 310 can be adapted to contain any number of outlets 18 or jacks 20 desired.

FIGS. 7–10 illustrate the structure of outlets 104 and 106 more clearly. Each pair of outlets 104 and 106 is substantially identical so only outlet pair 104 will be discussed in detail. The pair of outlets 104 includes two L-shaped bus bars 238 and 240 and one U-shaped bus bar 242. Bus bar 238 is the hot bus bar and bus bar 240 is the neutral bus bar. L-shaped bus bars 238 and 240 are substantially identical except that bus bar 240 is positioned upside-down relative to bus bar 238. Of course, this saves in manufacturing costs since only two types of bus bars need be manufactured for the three bus bars required for a full assembly of a pair of outlets 104.

Each of bus bars 238 and 240 have a long section 252 with an end plate 254 attached thereto, a short section 256 an end plate 258 attached thereto, and a lead attaching member 260 extending from the long section 252. The member 260 permits attaching to one of lead 115 or 119. The terminals 114 and 118 are coupled to the end plates 254 and 258. With bus bar 238 the terminals 114 will be coupled to the top side of the plates 254 while with bus bar 240, the terminals 118 will be coupled to the bottom side of the plates 258. This use of both sides of plates 254 and 258 permits the bus bar to be used as bus bar 238 or bus bar 240. Additionally, the long and short sections 252 and 256 are bent in the same direction at the junction with plates 254 and 258 so that the plates 254 and 258 lie in a different plane than the long and short sections 252. This bending of the bus bars 238 and 240 enables the bus bars to be positioned in different planes when fully assembled, thus permitting the overlapping configuration. In other words, the bent bus bars 238 and 240 permit the bus bars to be overlapped while not touching.

U-shaped bus bar or ground bus bar 242 has a mid section 272, end portions 274, and a lead attaching member coupled to the mid section 272 for receiving lead wire 123. End portions 274 receive ground terminals 122. Mid section 272 and end portions 274 can be in one plane since the bending of the bus bars 238 and 240 permits no contact between any of the three bus bars 238, 240, and 242.

All bus bars 238, 240 and 242 are positioned on the top surface of base 112 with only the lead wires 115, 119, and 123 extending through the base 112. As set forth above, the lead wires 115, 119, and 123 can be spliced with other lead wired from the other pair of outlets 106 below the base.

While particular embodiments have been chosen to illustrate the invention, it will be understood by those skilled in the art that various changes and modifications can be made therein without departing from the scope of the invention as defined in the appended claims.

What is claimed is:

1. A fitting comprising:
   an electrical receptacle; and
   a first pair of electrical outlets coupled to said electrical receptacle and having a first L-shaped bus bar, a second L-shaped bus bar, and a third bus bar, each of said first, second and third bus bars extending in first, second and third substantially parallel planes, each of said first, second, and third bus bars having first and second ends and each of said first and second ends having a terminal for receiving a prong of an electrical plug, each of said terminals extending in a direction substantially perpendicular to said first, second and third substantially parallel planes.

2. A fitting according to claim 1, wherein
each of said first and second L-shaped bus bars have a longitudinal portion and a transverse portion, which extends transversely from said longitudinal portion.

3. A fitting according to claim 1, wherein
each of said first and second L-shaped bus bars are substantially identical.

4. A fitting according to claim 3, wherein
each of said first and second L-shaped bus bars have a top surface and a bottom surface, and said bottom surface of said first L-shaped bus bar faces said top surface of said second L-shaped bus bar.

5. A fitting comprising:
an electrical receptacle being sized to fit within an approximately three inch diameter substantially circular opening and having a base and an upstanding wall coupled to said base, said base having a top surface and a bottom surface; and
a first pair of electrical outlets coupled to said electrical receptacle and having a first bus bar, a second bus bar, and a third bus bar, each of said first, second, and third bus bars having first and second ends and each of said first and second ends having a terminal for receiving a prong of an electrical plug, and said first, second, and third bus bars being positioned on the top surface of said base.

6. A fitting according to claim 5, wherein
each of said bus bars directly connect to a wire, which extends through said base.

7. A fitting according to claim 5, further comprising:
a second pair of electrical outlets coupled to said electrical receptacle and having a fourth bus bar, a fifth bus bar, and a sixth bus bar, each of said fourth, fifth, and sixth bus bars having first and second ends and each of said first and second ends of said fourth, fifth, and sixth bus bars having a terminal for receiving a prong of an electrical plug, and said fourth, fifth, and sixth bus bars being positioned on the top surface of said base.

8. A fire rated poke through fitting for insertion into an opening in a floor, comprising:
an electrical receptacle having a base with a top surface and a bottom surface;
a first pair of electrical outlets coupled to said electrical receptacle on said top surface of said base and electrically connected to an electrical source by a first set of electrical wires; and
a second pair of electrical outlets coupled to said electrical receptacle on said top surface of said base and electrically connected to said electrical source by a second set of electrical wires;
said first and second sets of wires extending completely through said base, and said first set and second set of wires being coupled together by splices, which are positioned adjacent said bottom surface of said base such that said base is positioned between said first and second pairs of electrical outlets and said splices.

9. A fitting according to claim 8, wherein
said splices are coupled to a third set of wires, which are coupled to the electrical source.

10. A fired rated poke thru fitting extending through a floor, comprising:
a housing;
at least three electrical outlets coupled to said housing;
at least three voice/data jacks coupled to said housing;
a low profile cover coupled to said housing, said cover having a top substantially planar surface and at least one access opening for accessing said at least three electrical outlets and said at least three voice/data jacks through said cover; and
said at least three electrical outlets having an uppermost surface and said at least three voice/data jacks having an uppermost surface, said uppermost surfaces of said at least three electrical outlets and said at least three voice/data jacks not extending above said top substantially planar surface of said cover.

11. A fire rated poke thru fitting according to claim 10, wherein
said at least three electrical outlets include at least four electrical outlets; and
said at least three voice/data jacks include at least four voice/data jacks.

12. A fire rated poke thru fitting according to claim 11, wherein
said housing is coupled to a tubular wiring conduit, and said wiring conduit is coupled to at least one ring-shaped intumescent fire barrier having an opening extending completely therethrough.

13. A fire rated poke thru fitting according to claim 10, wherein
said housing is coupled to a tubular wiring conduit, and said wiring conduit is coupled to at least one ring-shaped intumescent fire barrier having an opening extending completely therethrough.

14. A fire rated poke thru fitting according to claim 10, wherein
said housing and cover do not extend more than about 0.53 inches above the floor.

15. A low profile fitting for extending through a floor, comprising:
a housing;
a first electrical outlet coupled to said housing and electrically connected to a first electrical source by a first set of electrical wires;
a second electrical outlet coupled to said housing and electrically connected to a second electrical source by a second set of electrical wires;
at least one voice/data jack coupled to said housing; and
a cover coupled to said housing, said cover having a top substantially planar surface extending parallel to said floor and at least one access opening for accessing said first and second electrical outlets and said at least one voice/data jack through said cover;
said first and second electrical outlets having an uppermost surface and said at least one voice/data jack having an uppermost surface, said uppermost surfaces of said first and second electrical outlets and said at least one voice/data jack not extending above said top substantially planar surface of said cover.

16. A fitting according to claim 15, wherein
said at least one voice/data jack includes at least two voice/data jacks.

17. A fitting according to claim 15, wherein
said at least one voice/data jack includes at least four voice/data jacks.

18. A fitting according to claim 15, wherein
said first electrical outlet is electrically connected to a third electrical outlet.

19. A fitting according to claim 15, wherein
said second electrical outlet is electrically connected to a fourth electrical outlet.

20. A fitting according to claim 19, wherein
said at least one voice/data jack includes at least four voice/data jacks.

21. A fitting according to claim 15, wherein
said housing is coupled to a tubular wiring conduit, and said wiring conduit is coupled to at least one ring-shaped intumescent fire barrier having an opening extending completely therethrough.

22. A fitting according to claim 21, wherein
said at least one voice/data jack includes at least four voice/data jacks.

23. A low profile fitting according to claim 15, wherein
said housing and cover do not extend more than about 0.53 inches above the floor.

24. A fitting for extending through a floor, comprising:
a housing;
a first pair of electrical outlets coupled to said housing and electrically connected to a first electrical source by a first set of electrical wires;
a second pair of electrical outlets coupled to said housing and electrically connected to a second electrical source by a second set of electrical wires; and
at least one voice/data jack coupled to said housing.

25. A fitting according to claim 24, wherein
said first pair of electrical outlets are coupled to a first L-shaped bus bar, a second L-shaped bus bar, and a third L-shaped bus bar, each of said first, second, and third L-shaped bus bars having first and second ends and each of said first and second ends having a terminal for receiving a prong of an electrical plug.

26. A fitting according to claim 24, wherein
said second pair of electrical outlets are coupled to a fourth L-shaped bus bar, a fifth L-shaped bus bar, and a sixth L-shaped bus bar, each of said fourth, fifth, and sixth L-shaped bus bars having first and second ends and each of said first and second ends of said fourth, fifth and sixth L-shaped bus bars having a terminal for receiving a prong of an electrical plug.

27. A fitting according to claim 24, and further including
a wiring conduit;
a ring-shaped fire barrier having an opening;
said housing being coupled to said wiring conduit and said first and second sets of wires extending through said wiring conduit and through said opening in said ring-shaped fire barrier.

28. A fitting according to claim 24, wherein
said at least one voice/data jack includes at least two voice/data jacks.

29. A fitting according to claim 24, wherein
said at least one voice/data jack includes at least four voice/data jacks.

30. A fitting according to claim 24, wherein
said floor has an opening therein and said opening has a perimeter; and
said at least one voice/data jack is coupled to said housing at least partially within said perimeter of said opening in said floor and coupled to said housing at least partially outside the perimeter of said opening.

31. A fitting according to claim 30, wherein
said at least one voice/data jack is at least partially received within said opening and below at least a portion of said floor.

32. A poke thru fitting extending from a first side of a floor through an opening in the floor to a second side of the floor, comprising:
a housing, at least a part of said housing received in said opening in said floor;
a first electrical outlet coupled to said housing adjacent said first side of said floor;
a second electrical outlet coupled to said housing adjacent said first side of said floor;
a first set of electrical wires electrically connected to said first electrical outlet, extending through said opening to said second side and electrically connected to a first electrical source; and
a second set of electrical wires electrically connected to said second electrical outlet, extending through said opening to said second side and electrically connected to a second electrical source.

33. A poke thru fitting according to claim 32, and further including
at least one voice/data jack coupled to said housing.

34. A poke thru fitting according to claim 33, wherein
said at least one voice/data jack includes at least two voice/data jacks.

35. A poke thru fitting according to claim 33, wherein
said at least one voice/data jacks includes at least four voice/data jacks.

36. A fitting according to claim 33, wherein
said opening has a perimeter; and
said at least one voice/data jack is coupled to said housing at least partially within said perimeter of said opening in said floor and coupled to said housing at least partially outside the perimeter of the opening.

37. A fitting according to claim 36, wherein
said at least one voice/data jack is at least partially received within said opening and below at least a portion of said floor.

38. A poke thru fitting according to claim 32, wherein
said first electrical outlet is electrically connected to a third electrical outlet.

39. A poke thru fitting according to claim 38, wherein
said second electrical outlet is electrically connected to a fourth electrical outlet.

40. A poke thru fitting according to claim 39, and further including
at least one voice/data jack coupled to said housing.

41. A poke thru fitting according to claim 40, wherein
said at least one voice/data jack includes at least two voice/data jacks.

42. A poke thru fitting according to claim 40, wherein
said at least one voice/data jack includes at least four voice/data jacks.

43. A poke thru fitting according to claim 32, wherein
said housing is coupled to a tubular wiring conduit, and said wiring conduit is coupled to at least one ring-shaped intumescent fire barrier having an opening extending completely therethrough.

44. A poke thru fitting according to claim 32, wherein
said housing and cover do not extend more than about 0.53 inches above the floor.

* * * * *